US011150137B2

(12) United States Patent
Puckett et al.

(10) Patent No.: US 11,150,137 B2
(45) Date of Patent: Oct. 19, 2021

(54) THERMAL IMAGING WITH AN INTEGRATED PHOTONICS CHIP

(71) Applicant: Honeywell International Inc., Morris Plains, NJ (US)

(72) Inventors: Matthew Wade Puckett, Phoenix, AZ (US); Jianfeng Wu, Tucson, AZ (US); Steven Tin, Edina, MN (US); Neil A. Krueger, Saint Paul, MN (US)

(73) Assignee: Honeywell International Inc., Charlotte, NC (US)

( * ) Notice: Subject to any disclaimer, the term of this patent is extended or adjusted under 35 U.S.C. 154(b) by 140 days.

(21) Appl. No.: 16/704,862

(22) Filed: Dec. 5, 2019

(65) Prior Publication Data

US 2021/0172803 A1 Jun. 10, 2021

(51) Int. Cl.
*G01J 5/08* (2006.01)
*G02B 6/42* (2006.01)
*G01J 3/12* (2006.01)
*G01J 5/00* (2006.01)

(52) U.S. Cl.
CPC ............. *G01J 5/0818* (2013.01); *G01J 3/12* (2013.01); *G01J 5/0003* (2013.01); *G02B 6/4215* (2013.01); *G01J 5/0862* (2013.01); *G01J 2003/1204* (2013.01); *G01J 2005/0077* (2013.01)

(58) Field of Classification Search
CPC ................................................. G01S 7/4816
See application file for complete search history.

(56) References Cited

U.S. PATENT DOCUMENTS

| 7,119,334 | B2 | 10/2006 | Secundo et al. | |
|---|---|---|---|---|
| 2011/0062333 | A1 | 3/2011 | Ben-Bassat | |
| 2017/0026123 | A1* | 1/2017 | DeDobbelaere | ....... H04B 10/40 |
| 2017/0153391 | A1* | 6/2017 | Verslegers | ............... G02B 6/30 |
| 2019/0391243 | A1* | 12/2019 | Nicolaescu | ............. G01S 17/42 |

OTHER PUBLICATIONS

Tin, Steven et al., "High Temperature and High Dynamic Bandwidth Photonic Sensor for Gas Flow Rate, Temperature, and Pressure Measurement", U.S. Appl. No. 16/569,581, filed Sep. 12, 2019, pp. 1-34, Published: US.

* cited by examiner

*Primary Examiner* — Yara B Green
(74) *Attorney, Agent, or Firm* — Fogg & Powers LLC

(57) ABSTRACT

An integrated photonics chip for thermal imaging comprises a photonics substrate including a plurality of receiver elements. Each receiver element comprises a first grating coupler optically coupled to a first waveguide filter and configured to receive a first wavelength of light at a given angle, with the first waveguide filter configured to pass the first wavelength of light; and a second grating coupler optically coupled to a second waveguide filter and configured to receive a second wavelength of light at the given angle, with second waveguide filter configured to pass the second wavelength of light. Each receiver element receives the wavelengths of light from an object of interest that emits the light due to blackbody radiation, and receives the wavelengths of light at respectively different angles. Each grating coupler receives a unique wavelength of light with respect to the other wavelengths of light received by the other grating couplers.

19 Claims, 7 Drawing Sheets

THERMAL IMAGING WITH AN INTEGRATED PHOTONICS CHIP

BACKGROUND

Within the aerospace industry, there is currently a need to monitor the temperature across the surface of an engine during operation to assess its performance in real time. Current technologies for such monitors typically only take a single measurement for the temperature of the engine at a number of discrete points, and are costly to produce.

Accordingly, there is a need for the development of advanced, spatially resolved temperature sensors for use in engine temperature monitoring.

SUMMARY

An integrated photonics chip for thermal imaging comprises a photonics substrate including a plurality of receiver elements. Each of the receiver elements comprises a first grating coupler optically coupled to a first waveguide filter, wherein the first grating coupler is configured to receive a first wavelength of light at a given angle, and the first waveguide filter is configured to pass the first wavelength of light; and a second grating coupler optically coupled to a second waveguide filter, wherein the second grating coupler is configured to receive a second wavelength of light at the given angle, and the second waveguide filter is configured to pass the second wavelength of light. Each of the receiver elements is configured to receive the wavelengths of light from an object of interest that emits the light due to blackbody radiation, and each of the receiver elements is configured to receive the wavelengths of light at respectively different angles from the object of interest. Each grating coupler in each of the receiver elements is configured to receive a unique wavelength of light with respect to the other wavelengths of light received by the other grating couplers.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Figure 1:
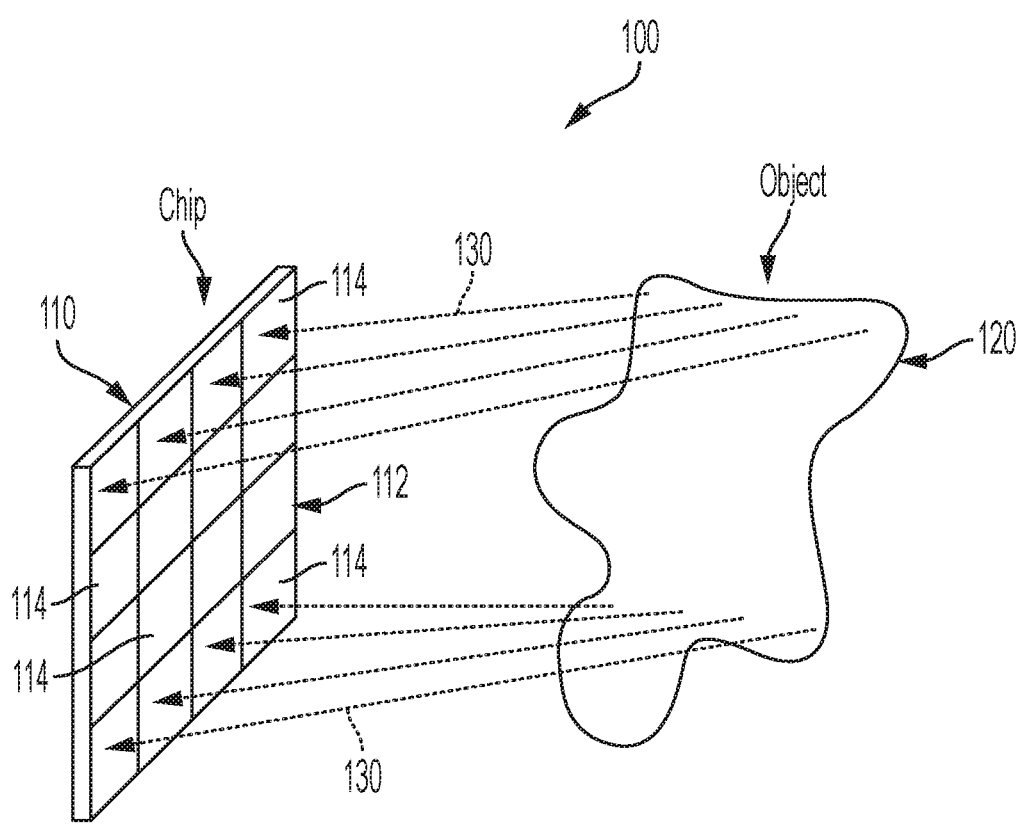
FIG. 1 is a schematic illustration of a system for thermal imaging using an integrated photonics chip, according to an exemplary implementation.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system and method for thermal imaging with an integrated photonics chip is described herein.

The integrated photonics chip includes an optical filter array having a plurality of receiver elements. Each receiver element comprises a first grating coupler optically coupled to a first waveguide filter, and which are configured to receive and pass a first wavelength of light at a given angle. Each receiver element also includes a second grating coupler optically coupled to a second waveguide filter, and which are configured to receive and pass a second wavelength of light at the given angle. The optical filter array is configured to receive light emitted from an object of interest due to blackbody radiation.

For example, when the object of interest includes a metallic surface that is heated to a high temperature, such as up to about 2000° C., the metallic surface will emit light due to blackbody radiation. The ratio of power densities of light emitted at two specific wavelengths can be used to determine the temperature of the metallic surface. In particular, the light received by the integrated photonics chip from a set of given angles can be used to determine the temperature at each angle. In order to analyze the light at each angle, the light is directed from the integrated photonics chip into an optical fiber, which carries the light out of the high temperature environment and into an optical spectrum analyzer, for example. In post-processing, the spectrum which is received can be used to construct a real time, spatially resolved map of the temperature across the surface of the metallic surface that the photonics chip is directed toward.

The integrated photonics chip according to the present approach can be fabricated by using an M×N array. For example, a first array receiver element includes two grating couplers and subsequent waveguide filters that are designed to receive two specific wavelengths of light (e.g., $\lambda_{11}$ and $\lambda_{21}$) from a first angle ($\theta_1$). A second array receiver element includes two grating couplers and subsequent waveguide filters that are designed to receive two other specific wavelengths of light (e.g., $\lambda_{12}$ and $\lambda_{22}$) from a second angle ($\theta_2$). This configuration can continue out to the M×Nth element of the array.

The present system and method provide for a significant reduction in size, weight, and power consumption, which can be achieved by measuring temperature remotely with the integrated photonics chip. This system additionally offers the advantage of having lower costs to produce.

In one aspect, the integrated photonics chip offers a way to remotely characterize the temperature of the entire surface of an engine, mapped out as a function of position. In one implementation, a stand-off surface temperature sensor for engine development and evaluation can be produced using the present approach.

For example, a stand-off surface temperature sensor can be implemented with an array of grating couplers, each measuring different points on a surface of interest. The stand-off surface temperature sensor includes optical filters combined with the grating couplers for frequency selection and, thus, detection location selectivity. A matching filter array can be used on a signal processing chip for signal decomposition, followed by data processing to generate a two-dimensional (2D) temperature map. This stand-off surface temperature sensor can be used to measure temperatures up to or greater than about 2000° C., and the measurement surface can cover an entire 7-steradian hemisphere.

Further details of various embodiments are described hereafter with reference to the drawings.

FIG. 1 is a schematic illustration of a system 100 for thermal imaging, according to an exemplary implementation. The system generally includes an integrated photonics chip 110, which is placed in an environment to monitor the temperature across the surface of an object of interest 120, with the face of the chip directed toward the object. For example, photonics chip 110 can be located in a high temperature environment such as near an engine during operation, to assess performance of the engine in real time.

The photonics chip 110 includes an optical filter array 112 with a plurality of pixel receiver elements 114. The optical filter array 112 is configured to receive light 130 emitted from object of interest 120 due to blackbody radiation. Each of receiver elements 114 is configured to collect two different wavelengths of emitted light 130 from a single direction or angle with respect to object of interest 120. A bus waveguide can be used to connect receiver elements 114 such that the unique wavelengths of light from different angles all end up on a single waveguide in the form of different intensities at different wavelengths.

The ratio between the intensities of the two collected wavelengths of light by each receiver element can be used to determine the temperature of object of interest 120. For example, the intensities of the two wavelengths of light collected by each receiver element are measured and compared to extract position-dependent temperature from known behavior of blackbody radiation. This can be done using an optical spectrum analyzer, for example, coupled to an output of photonics chip 110. Alternatively, a detector that can measure radio frequency (RF) beat notes can be utilized if suitable processing is employed. The spectral information can then be used to generate a real time, spatially resolved thermal image map of the temperature across the surface of object of interest 120.

While a 4×4 pixel array of receiver elements is shown in FIG. 1, it will be understood that additional receiver elements can be added to form larger pixel arrays of receiver elements. The additional receiver elements can be added to increase resolution of a thermal image map generated for an object of interest.

Figure 2:
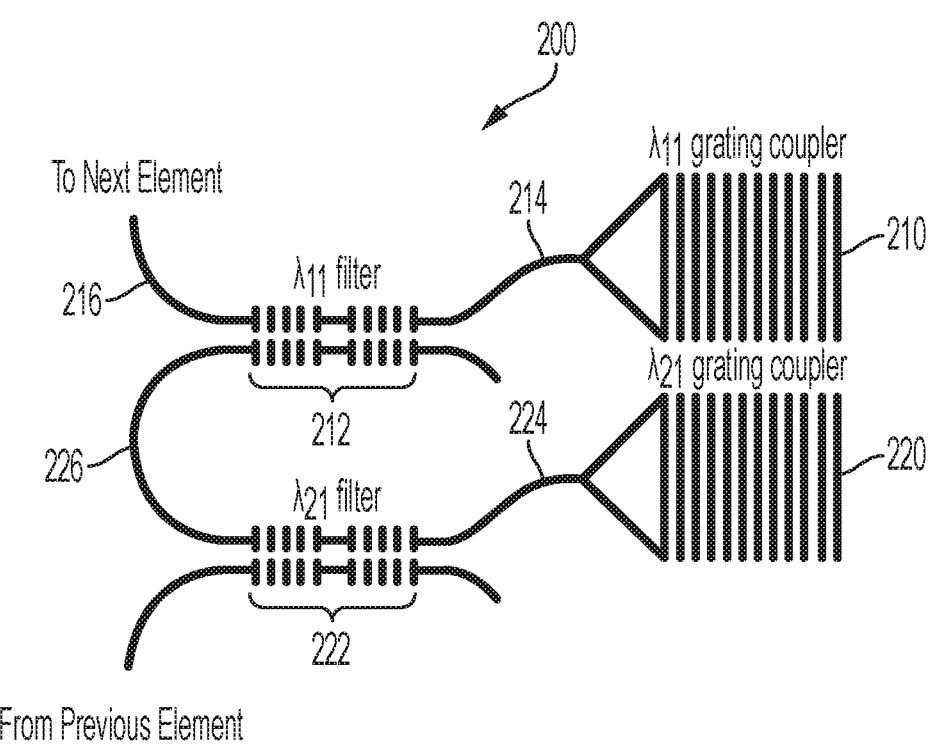
FIG. 2 is a schematic illustration of a single receiver element, according to one embodiment, which can be implemented in an optical filter array of an integrated photonics chip.

FIG. 2 illustrates a single receiver element 200, according to one embodiment, which can be implemented in an optical filter array of an integrated photonics chip. The receiver element 200 comprises a first grating coupler 210 optically coupled to a first waveguide filter 212, such as through an input waveguide 214. The first grating coupler 210 is configured to receive a first wavelength of light ($\lambda_{11}$) at a given angle, and the first waveguide filter 212 is configured to pass the first wavelength of light ($\lambda_{11}$) onto the next receiver element in the optical filter array through a connecting waveguide 216.

A second grating coupler 220 is optically coupled to a second waveguide filter 222, such as through an input waveguide 224. The second grating coupler 220 is configured to receive a second wavelength of light ($\lambda_{21}$) at the given angle, and the second waveguide filter 222 is configured to pass the second wavelength of light ($\lambda_{21}$) to waveguide filter 212 through a connecting waveguide 226.

Figure 3:
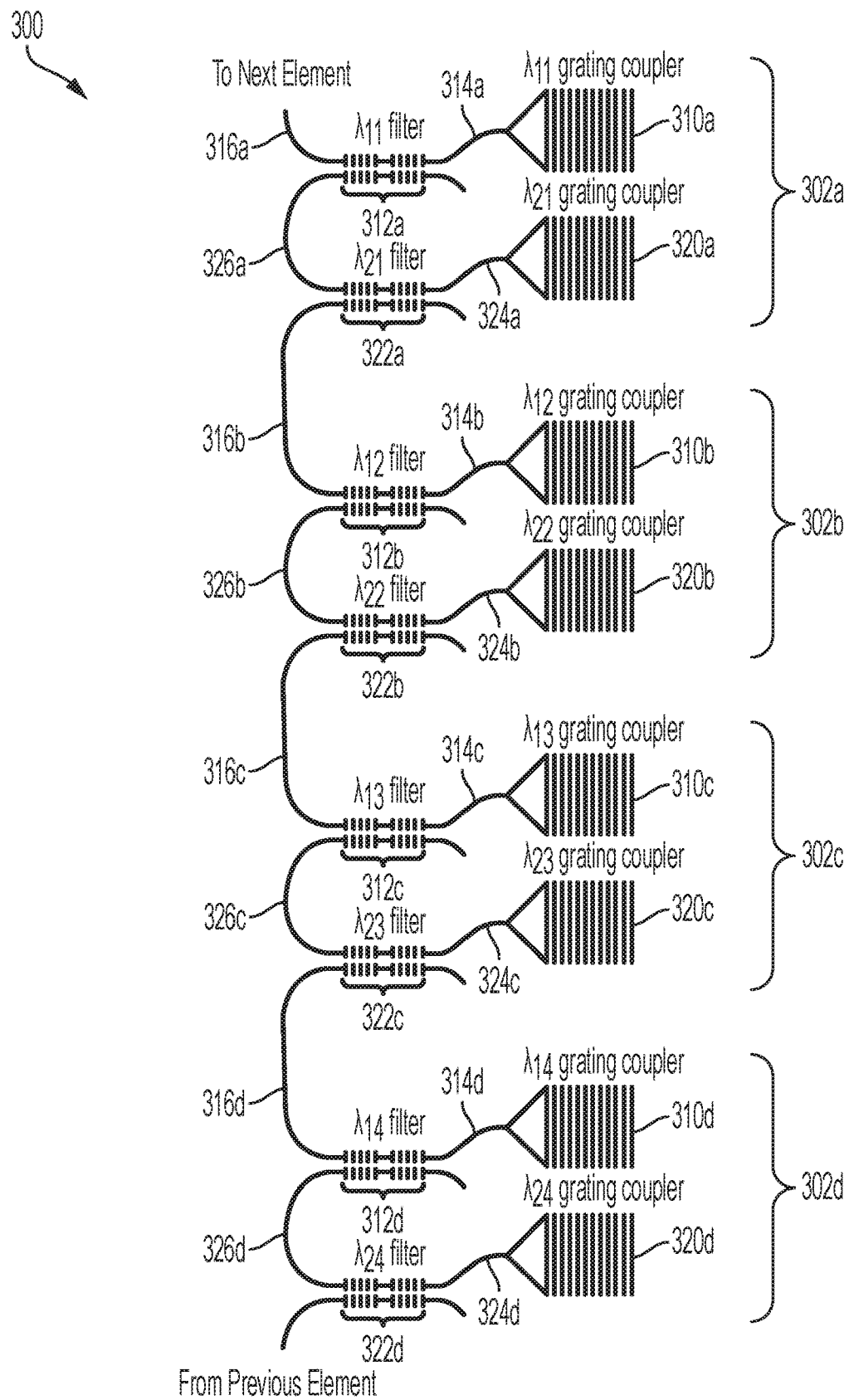
FIG. 3 is a schematic illustration of a receiver element array, according to an exemplary embodiment, which can be implemented as part of an integrated photonics chip.

FIG. 3 illustrates a receiver element array 300, according to an exemplary embodiment, which can be implemented as part of an integrated photonics chip. The receiver element array 300 includes a set of interconnected receiver elements, including a first receiver element 302a, a second receiver element 302b, a third receiver element 302c, and a fourth receiver element 302d. While four receiver elements are shown in the array of FIG. 3, it will be understood that additional receiver elements can be interconnected in various array configurations as needed.

The first receiver element 302a includes a pair of grating couplers 310a, 320a optically coupled to respective waveguide filters 312a, 322a, such as through respective input waveguides 314a, 324a. The grating coupler 310a is configured to receive a first wavelength of light ($\lambda_{11}$) at a first given angle, and waveguide filter 312a is configured to pass the first wavelength of light ($\lambda_{11}$) onto the next receiver element in the array through a connecting waveguide 316a. The grating coupler 320a is configured to receive a second wavelength of light ($\lambda_{21}$) at the first given angle, and waveguide filter 322a is configured to pass the second wavelength of light ($\lambda_{21}$) to waveguide filter 312a through a connecting waveguide 326a.

The second receiver element 302b includes a pair of grating couplers 310b, 320b optically coupled to respective waveguide filters 312b, 322b, such as through respective input waveguides 314b, 324b. The grating coupler 310b is configured to receive a third wavelength of light ($\lambda_{12}$) at a second given angle, and waveguide filter 312b is configured to pass the third wavelength of light ($\lambda_{12}$) to first receiver element 302a through a connecting waveguide 316b. The grating coupler 320b is configured to receive a fourth wavelength of light ($\lambda_{22}$) at the second given angle, and waveguide filter 322b is configured to pass the fourth wavelength of light ($\lambda_{22}$) to waveguide filter 312b through a connecting waveguide 326b.

The third receiver element 302c includes a pair of grating couplers 310c, 320c optically coupled to respective waveguide filters 312c, 322c, such as through respective input waveguides 314c, 324c. The grating coupler 310c is configured to receive a fifth wavelength of light ($\lambda_{13}$) at a third given angle, and waveguide filter 312c is configured to pass the fifth wavelength of light ($\lambda_{13}$) to second receiver element 302b through a connecting waveguide 316c. The grating coupler 320c is configured to receive a sixth wavelength of light ($\lambda_{23}$) at the third given angle, and waveguide filter 322c is configured to pass the sixth wavelength of light ($\lambda_{23}$) to waveguide filter 312c through a connecting waveguide 326c.

The fourth receiver element 302d includes a pair of grating couplers 310d, 320d optically coupled to respective waveguide filters 312d, 322d, such as through respective input waveguides 314d, 324d. The grating coupler 310d is configured to receive a seventh wavelength of light ($\lambda_{14}$) at a fourth given angle, and waveguide filter 312d is configured to pass the seventh wavelength of light ($\lambda_{14}$) to third receiver element 302c through a connecting waveguide 316d. The grating coupler 320d is configured to receive an eighth wavelength of light ($\lambda_{24}$) at the fourth given angle, and waveguide filter 322d is configured to pass the eighth wavelength of light ($\lambda_{24}$) to waveguide filter 312d through a connecting waveguide 326d.

An integrated photonics chip with the above described optical filter array can be implemented as part of a stand-off surface temperature sensor 400, which is illustrated in FIG.

4 according to an exemplary embodiment. The surface temperature sensor 400 generally includes a passive photonics sensor head chip 410, and a photonics signal processing chip 430 in optical communication with sensor head chip 410, such as through an optical fiber 450.

The sensor head chip 410 is configured to be located in a "hot zone" of a region of interest 420. The hot zone of region of interest 420 can include temperatures up to about 2000° C., for example. The signal processing chip 430 is configured to be located in a "cold zone" region 440 that is located away from the hot zone of region of interest 420. The cold zone region 440 can include temperature ranges of about −40° C. to about 300° C., for example.

The sensor head chip 410 includes a first photonics substrate 412, such as a silicon photonics (SiP) substrate. An array of grating couplers 414, 416, such as SiP grating couplers, are arranged on photonics substrate 412 and are respectively coupled to waveguide filters 415, 417.

A first receiver element on sensor head chip 410 includes grating couplers 414a and 416a, which are optically coupled to respective waveguide filters 415a and 417a. The grating coupler 414a is configured to receive a first wavelength of light ($\lambda_{11}$) at a first given angle, and waveguide filter 415a is configured to pass the first wavelength of light ($\lambda_{11}$). The grating coupler 416a is configured to receive a second wavelength of light ($\lambda_{21}$) at the first given angle, and waveguide filter 417a is configured to pass the second wavelength of light ($\lambda_{21}$).

A second receiver element on sensor head chip 410 includes grating couplers 414b and 416b, which are optically coupled to respective waveguide filters 415b and 417b. The grating coupler 414b is configured to receive a third wavelength of light ($\lambda_{12}$) at a second given angle, and waveguide filter 415b is configured to pass the third wavelength of light ($\lambda_{12}$). The grating coupler 416b is configured to receive a fourth wavelength of light ($\lambda_{22}$) at the second given angle, and waveguide filter 417b is configured to pass the fourth wavelength of light ($\lambda_{22}$).

Likewise, one or more additional receiver elements can be located on sensor head chip 410, and include additional grating couplers (414n, 416n) that are respectively coupled to additional waveguide filters (415n, 417n). The additional grating couplers are configured to receive different wavelengths of light ($\lambda_{1n}$, $\lambda_{2n}$) at further respective angles, and the additional waveguide filters are configured to pass the different wavelengths of light.

The signal processing chip 430 includes a second photonics substrate 432, such as a SiP substrate. A passive optical filter array 434 is located on photonics substrate 432. The optical filter array 434 is configured to receive the light from optical fiber 450 coupled to sensor head chip 410. The optical fiber 450 can be a high temperature glass fiber or sapphire fiber. To make sure the fiber to waveguide attachments on the sensor chips can survive high temperatures, fusion splicing can be used to ensure a permanent connection.

The optical filter array 434 includes a plurality of optical notch filters 436 in optical communication with each other. A plurality of optical detectors 438 are each respectively coupled to outputs of optical notch filters 436. The optical notch filters 436 are operative for frequency selection such that each notch filter passes a selected frequency from a frequency spectrum to a respective one of optical detectors 438.

Further details with respect to the grating couplers and notch filters, which are suitable for use in surface temperature sensor 400, are described in U.S. application Ser. No. 16/569,581, entitled "HIGH TEMPERATURE AND HIGH DYNAMIC BANDWIDTH PHOTONIC SENSOR FOR GAS FLOW RATE, TEMPERATURE, AND PRESSURE MEASUREMENT," the disclosure of which is incorporated herein by reference.

The optical filter array 434 is operative to perform passive frequency spectrum decomposition of the received light into a plurality of signals, which are used for data extraction by a data processing unit 460, coupled to an output of signal processing chip 430.

During operation of surface temperature sensor 400, the light from blackbody radiation is collected from an object in region of interest 420 by sensor head chip 410, at different wavelengths and angles, through the array of grating couplers 414, 416, and respective waveguide filters 415, 417. For example, grating coupler 414a receive a first wavelength of light ($\lambda_{11}$) at a first given angle, and waveguide filter 415a passes the first wavelength of light to a bus waveguide. The grating coupler 416a receives a second wavelength of light ($\lambda_{21}$) at the first given angle, and waveguide filter 417a passes the second wavelength of light ($\lambda_{21}$) to the bus waveguide. This light collection process is also performed by the other grating couplers and respective waveguide filters on sensor head chip 410. The collected light is then sent from the bus waveguide to optical filter array 434 through optical fiber 450.

The light received by optical filter array 434 is directed, such as by a waveguide, to an input port of a first notch filter 436a. A selected first frequency is passed through a drop port of first notch filter 436a to a first detector 438a, and the remaining frequencies are reflected through a reflection port of first notch filter 436a to an input port of a second notch filter 436b. A selected second frequency is passed through a drop port of second notch filter 436b to a second detector 438b, and the remaining frequencies are reflected through a reflection port of second notch filter 436b to an input port of a third notch filter 436c. This filtering process continues until all of the notch filters have passed respective selected frequencies to their respective detectors. In this way, optical filter array 434 performs a passive frequency spectrum decomposition of the light into a plurality of output signals, which are used for data extraction and processing by data processing unit 460. The extracted data is processed to construct a real time, spatially resolved map of the temperature across a surface of the object in region of interest 420.

Figure 4:
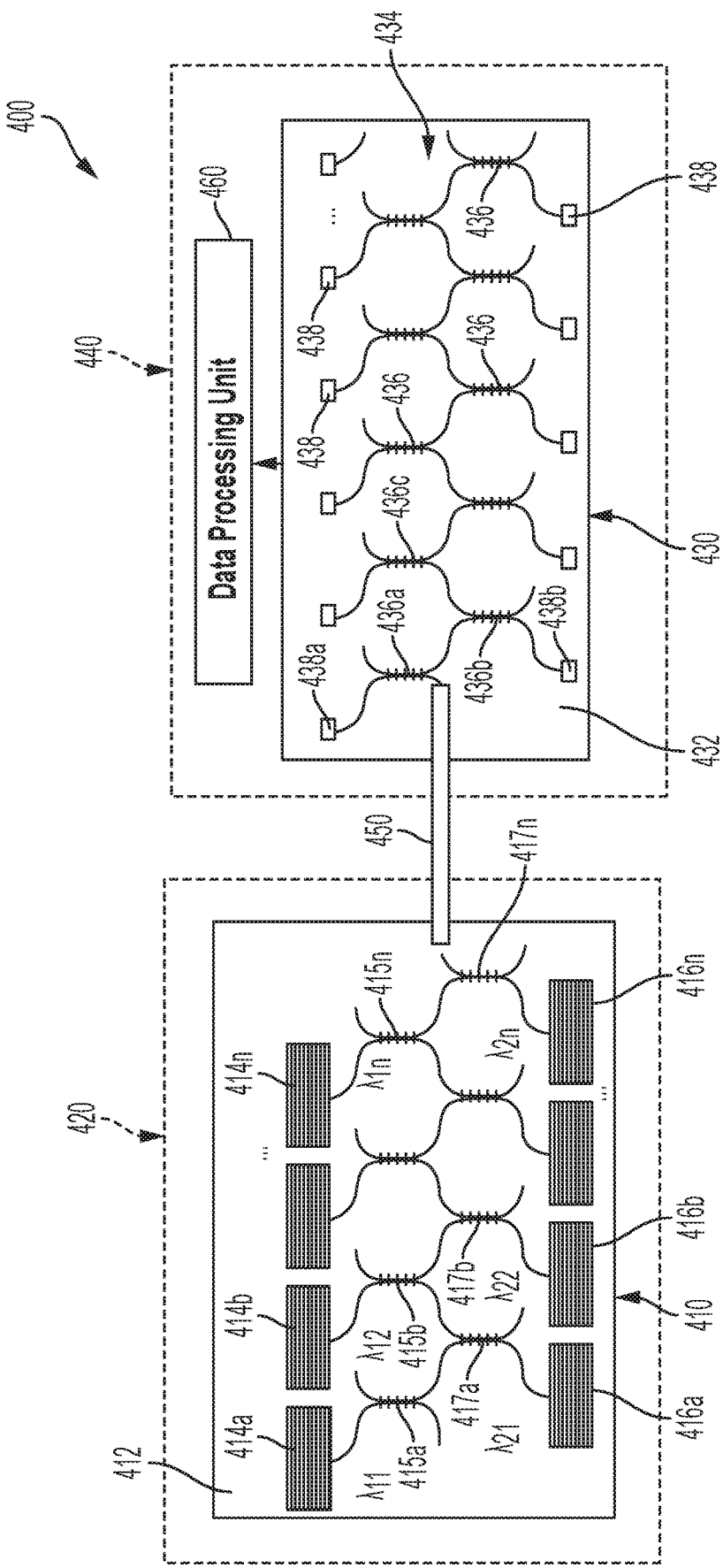
FIG. 4 is a schematic illustration of a stand-off surface temperature sensor, according to an exemplary embodiment.
Figure 5:
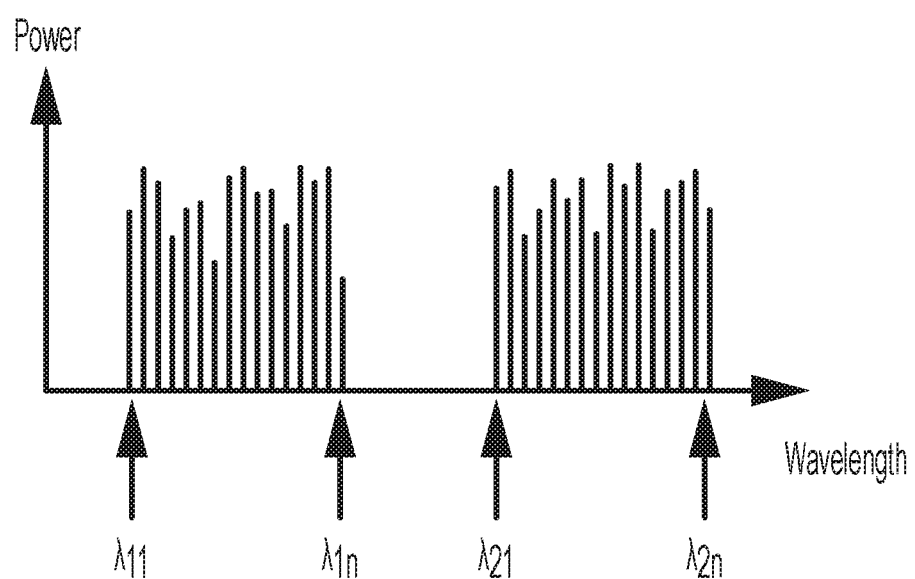
FIG. 5 is a graphical representation of exemplary measurements that can be obtained from the stand-off surface temperature sensor of FIG. 4.

FIG. 5 is a graphical representation of exemplary measurements that can be obtained from the surface temperature sensor of FIG. 4. FIG. 5 shows the power densities of the light with respect to the wavelengths of the light for $\lambda_{11}$ to $\lambda_{1n}$ and $\lambda_{21}$ to $\lambda_{2n}$.

Figure 6:
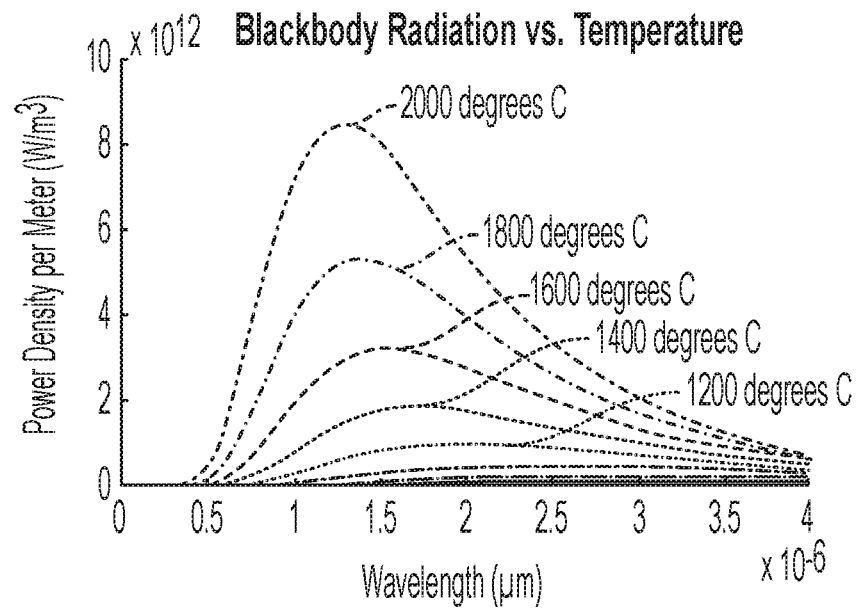
FIG. 6 is a graph showing that blackbody radiation has a spectrum of intensity of emitted light with respect to wavelength that is dependent on the temperature of an object.

FIG. 6 is a graph of blackbody radiation with respect to temperature. In particular, FIG. 6 shows the light power density with respect to light wavelength for various temperatures, from 2000° C. to 1200° C. The plot in FIG. 6 indicates that blackbody radiation has a spectrum of intensity of emitted light with respect to wavelength that is dependent on a temperature of the object.

Figure 7:
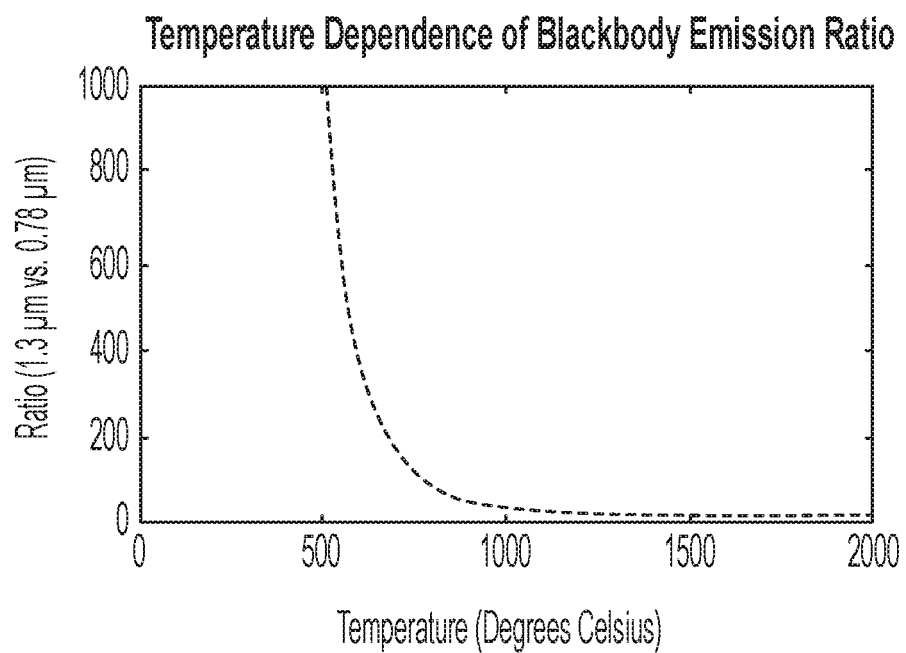
FIG. 7 is a graph showing the temperature dependence of blackbody emission ratios.

FIG. 7 is a graph showing the temperature dependence of the blackbody emission ratio. As shown in FIG. 7, the blackbody radiation temperature can be determined from the power ratio of two wavelengths (e.g., 1.3 μm vs. 0.78 μm).

Figure 8:
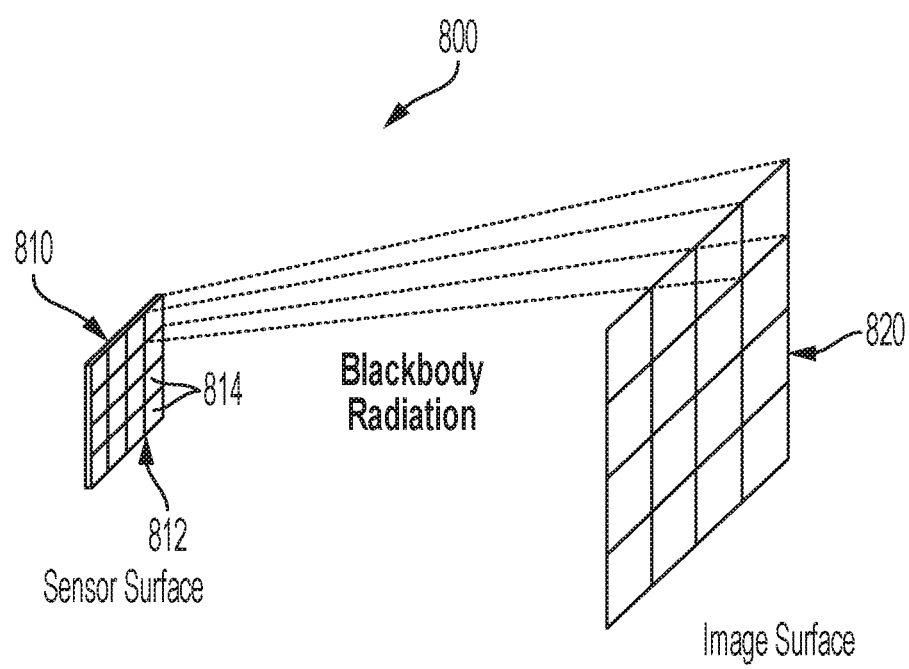
FIG. 8 is a schematic illustration of a thermal imaging system, according to an exemplary implementation.

FIG. 8 is a schematic illustration of a thermal imaging system 800, according to an exemplary implementation. The system 800 generally includes an integrated photonics chip 810, which is placed in an environment to monitor the temperature across the surface of an object. The integrated photonics chip 810 includes an optical filter array 812 with a plurality of pixel receiver elements 814. The optical filter array 812 is configured to receive light emitted from the object due to blackbody radiation. Each of receiver elements 814 is configured to collect two wavelengths of the emitted light from specific angles.

The intensities of the two collected wavelengths of light from each receiver element are measured and compared to extract position-dependent temperature from known behavior of blackbody radiation, such as by using an optical spectrum analyzer. The analyzed spectrum can then be used to construct a real time, spatially resolved thermal image map 820 of the temperature across the surface of object.

A computer or processor used in the present systems and methods can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present methods.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact discs, DVDs, Blu-ray discs, or other optical storage media; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

Example Embodiments

Example 1 includes an integrated photonics chip for thermal imaging, the integrated photonics chip comprising: a photonics substrate including a plurality of receiver elements, each of the receiver elements comprising: a first grating coupler optically coupled to a first waveguide filter, wherein the first grating coupler is configured to receive a first wavelength of light at a given angle, and the first waveguide filter is configured to pass the first wavelength of light; and a second grating coupler optically coupled to a second waveguide filter, wherein the second grating coupler is configured to receive a second wavelength of light at the given angle, and the second waveguide filter is configured to pass the second wavelength of light; wherein each of the receiver elements is configured to receive the wavelengths of light from an object of interest that emits the light due to blackbody radiation; wherein each of the receiver elements is configured to receive the wavelengths of light at respectively different angles from the object of interest; wherein each grating coupler in each of the receiver elements is configured to receive a unique wavelength of light with respect to the other wavelengths of light received by the other grating couplers.

Example 2 includes the integrated photonics chip of Example 1, wherein the photonics substrate comprises a silicon photonics substrate.

Example 3 includes the integrated photonics chip of any of Examples 1-2, wherein the first and second grating couplers comprise silicon photonics grating couplers.

Example 4 includes the integrated photonics chip of any of Examples 1-3, wherein the first grating coupler is optically coupled to the first waveguide filter through an input waveguide.

Example 5 includes the integrated photonics chip of any of Examples 1-4, wherein the second grating coupler is optically coupled to the second waveguide filter through an input waveguide.

Example 6 includes the integrated photonics chip of any of Examples 1-5, wherein an output of the photonics substrate is configured to be optically coupled to an optical spectrum analyzer.

Example 7 includes the integrated photonics chip of Example 6, wherein the optical spectrum analyzer is configured to compare the first and second wavelengths of light from each receiver element to extract position-dependent temperature information from known behavior of the blackbody radiation.

Example 8 includes the integrated photonics chip of Example 7, wherein the position-dependent temperature information is used to generate a real time, spatially resolved thermal image map of temperature across a surface of the object of interest.

Example 9 includes a sensor system for thermal imaging, the sensor system comprising a passive sensor head chip including a first photonics substrate and comprising: an optical filter array including a plurality of receiver elements, each of the receiver elements comprising: a first grating coupler optically coupled to a first waveguide filter, wherein the first grating coupler is configured to receive a first wavelength of light at a first given angle, and the first waveguide filter is configured to pass the first wavelength of light; and a second grating coupler optically coupled to a second waveguide filter, wherein the second grating coupler is configured to receive a second wavelength of light at the first given angle, and the second waveguide filter is configured to pass the second wavelength of light; wherein each of the receiver elements is configured to receive the wavelengths of light from an object of interest that emits the light due to blackbody radiation; wherein each of the receiver elements is configured to receive the wavelengths of light at respectively different angles from the object of interest; wherein each grating coupler in each of the receiver elements is configured to receive a unique wavelength of light with respect to the other wavelengths of light received by the other grating couplers. A signal processing chip is in optical communication with the passive sensor head chip, with the signal processing chip including a second photonics substrate and comprising: a passive optical filter array on the second photonics substrate, the passive optical filter array configured to receive the light from the passive sensor head chip; wherein the passive optical filter array includes: a plurality of optical notch filters in optical communication with each other, the optical notch filters operative for frequency selection; and a plurality of optical detectors each respectively coupled to an output of one of the optical notch filters; wherein the passive optical filter array is operative to perform frequency spectrum decomposition of the received light into a plurality of signals used for data extraction and processing to generate a real time, spatially resolved thermal image map of temperatures across a surface of the object of interest.

Example 10 includes the sensor system of Example 9, wherein the first and second photonics substrates comprise silicon photonics substrates.

Example 11 includes the sensor system of any of Examples 9-10, wherein the first and second grating couplers comprise silicon photonics gating couplers.

Example 12 includes the sensor system of any of Examples 9-11, wherein the passive sensor head chip is configured to be located in a first higher temperature zone associated with the region of interest; and the signal processing chip is configured to be located in a second lower temperature zone away from the region of interest.

Example 13 includes the sensor system of any of Examples 9-12, wherein the surface of the object of interest includes a metallic surface that is heated to a temperature up to about 2000° C.

Example 14 includes the sensor system of Example 13, wherein the metallic surface emits light due to blackbody radiation.

Example 15 includes the sensor system of any of Examples 13-14, wherein the metallic surface comprises a surface of an engine.

Example 16 includes the sensor system of any of Examples 9-15, wherein the sensor system comprises a stand-off surface temperature sensor for engine development and evaluation.

Example 17 includes the sensor system of any of Examples 9-16, further comprising a data processing unit coupled to an output of the signal processing chip.

Example 18 includes the sensor system of Example 17, wherein the data processing unit is configured to compare the two wavelengths of light from each receiver element to extract position-dependent temperature information from known behavior of the blackbody radiation.

Example 19 includes the sensor system of Example 18, wherein the position-dependent temperature information is used to generate the real time, spatially resolved thermal image map of the temperatures across the surface of the object of interest.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. An integrated photonics chip for thermal imaging, the integrated photonics chip comprising:
    a photonics substrate including a plurality of receiver elements, each of the receiver elements comprising:
        a first grating coupler optically coupled to a first waveguide filter, wherein the first grating coupler is configured to receive a first wavelength of light at a given angle, and the first waveguide filter is configured to pass the first wavelength of light; and
        a second grating coupler optically coupled to a second waveguide filter, wherein the second grating coupler is configured to receive a second wavelength of light at the given angle, and the second waveguide filter is configured to pass the second wavelength of light;
    wherein each of the receiver elements is configured to receive the wavelengths of light from an object of interest that emits the light due to blackbody radiation;
    wherein each of the receiver elements is configured to receive the wavelengths of light at respectively different angles from the object of interest;
    wherein each grating coupler in each of the receiver elements is configured to receive a unique wavelength of light with respect to the other wavelengths of light received by the other grating couplers.

2. The integrated photonics chip of claim 1, wherein the photonics substrate comprises a silicon photonics substrate.

3. The integrated photonics chip of claim 1, wherein the first and second grating couplers comprise silicon photonics grating couplers.

4. The integrated photonics chip of claim 1, wherein the first grating coupler is optically coupled to the first waveguide filter through an input waveguide.

5. The integrated photonics chip of claim 1, wherein the second grating coupler is optically coupled to the second waveguide filter through an input waveguide.

6. The integrated photonics chip of claim 1, wherein an output of the photonics substrate is configured to be optically coupled to an optical spectrum analyzer.

7. The integrated photonics chip of claim 1, wherein the optical spectrum analyzer is configured to compare the first and second wavelengths of light from each receiver element to extract position-dependent temperature information from known behavior of the blackbody radiation.

8. The integrated photonics chip of claim 7, wherein the position-dependent temperature information is used to generate a real time, spatially resolved thermal image map of temperature across a surface of the object of interest.

9. A sensor system for thermal imaging, the sensor system comprising:
    a passive sensor head chip including a first photonics substrate and comprising:
        an optical filter array including a plurality of receiver elements, each of the receiver elements comprising:
            a first grating coupler optically coupled to a first waveguide filter, wherein the first grating coupler is configured to receive a first wavelength of light at a first given angle, and the first waveguide filter is configured to pass the first wavelength of light; and
            a second grating coupler optically coupled to a second waveguide filter, wherein the second grating coupler is configured to receive a second wavelength of light at the first given angle, and the second waveguide filter is configured to pass the second wavelength of light;
        wherein each of the receiver elements is configured to receive the wavelengths of light from an object of interest that emits the light due to blackbody radiation;
        wherein each of the receiver elements is configured to receive the wavelengths of light at respectively different angles from the object of interest;
        wherein each grating coupler in each of the receiver elements is configured to receive a unique wavelength of light with respect to the other wavelengths of light received by the other grating couplers; and a signal processing chip in optical communication with the passive sensor head chip, the signal processing chip including a second photonics substrate and comprising:

a passive optical filter array on the second photonics substrate, the passive optical filter array configured to receive the light from the passive sensor head chip;

wherein the passive optical filter array includes:

a plurality of optical notch filters in optical communication with each other, the optical notch filters operative for frequency selection; and a plurality of optical detectors each respectively coupled to an output of one of the optical notch filters;

wherein the passive optical filter array is operative to perform frequency spectrum decomposition of the received light into a plurality of signals used for data extraction and processing to generate a real time, spatially resolved thermal image map of temperatures across a surface of the object of interest.

10. The sensor system of claim 9, wherein the first and second photonics substrates comprise silicon photonics substrates.

11. The sensor system of claim 9, wherein the first and second grating couplers comprise silicon photonics grating couplers.

12. The sensor system of claim 9, wherein:

the passive sensor head chip is configured to be located in a first higher temperature zone associated with the region of interest; and the signal processing chip is configured to be located in a second lower temperature zone away from the region of interest.

13. The sensor system of claim 9, wherein the surface of the object of interest includes a metallic surface that is heated to a temperature up to about 2000° C.

14. The sensor system of claim 13, wherein the metallic surface emits light due to blackbody radiation.

15. The sensor system of claim 13, wherein the metallic surface comprises a surface of an engine.

16. The sensor system of claim 15, wherein the sensor system comprises a stand-off surface temperature sensor for engine development and evaluation.

17. The sensor system of claim 9, further comprising a data processing unit coupled to an output of the signal processing chip.

18. The sensor system of claim 17, wherein the data processing unit is configured to compare the two wavelengths of light from each receiver element to extract position-dependent temperature information from known behavior of the blackbody radiation.

19. The sensor system of claim 18, wherein the position-dependent temperature information is used to generate the real time, spatially resolved thermal image map of the temperatures across the surface of the object of interest.

* * * * *